United States Patent [19]

Ebeling, Jr. et al.

[11] 4,167,819
[45] Sep. 18, 1979

[54] PRESSURE REGULATOR

[75] Inventors: Robert W. Ebeling, Jr.; Robert B. Weaver, both of Reading, Pa.

[73] Assignee: The United States of America as represented by the United States Department of Energy, Washington, D.C.

[21] Appl. No.: 857,649

[22] Filed: Dec. 5, 1977

[51] Int. Cl.² .......................... F26B 3/08; F27B 15/00
[52] U.S. Cl. ........................................... 34/10; 432/15
[58] Field of Search ...................... 34/10, 57 A, 57 R; 432/58, 15

[56] References Cited

U.S. PATENT DOCUMENTS

| | | | |
|---|---|---|---|
| 2,886,899 | 5/1959 | Watkins | 34/57 A |
| 2,997,286 | 8/1961 | Friese | 432/58 X |
| 3,737,283 | 6/1973 | Nikles | 432/15 |
| 3,861,058 | 1/1975 | Whelan | 34/10 |
| 4,106,210 | 8/1978 | Jukkola | 34/57 R |

FOREIGN PATENT DOCUMENTS 183731  6/1953  Sweden ..................... 432/15

*Primary Examiner*—John J. Camby
*Attorney, Agent, or Firm*—Dean E. Carlson; Frank H. Jackson

[57] ABSTRACT

The pressure within a pressurized flow reactor operated under harsh environmental conditions is controlled by establishing and maintaining a fluidized bed of uniformly sized granular material of selected density by passing the gas from the reactor upwardly therethrough at a rate sufficient to fluidize the bed and varying the height of the bed by adding granular material thereto or removing granular material therefrom to adjust the backpressure on the flow reactor.

2 Claims, 2 Drawing Figures

BED PRESSURE DROP

PRESSURE REGULATOR

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to a pressure regulator for harsh environment service and also relates to a method of maintaining a desired back pressure on a variable flow gas stream.

In many continuous chemical or metallurgical processes where reactions are carried out in pressurized flow reactors—reactors in which a gas flows in to and out of a reactor vessel within which it takes part in a chemical reaction—it is desirable to maintain the reactor vessel at a controlled pressure. This is usually accomplished by a control valve which imposes a variable area flow restriction in the exit gas line. However, control valves generally have narrow ranges of pressure or flow over which control is precise. In addition when high temperatures and/or entrained particulates and/or corrosive constituents occur in the exit gas stream, and also when the gas flow from the reactor fluctuates greatly with time, the control valves malfunction rendering them unreliable and perhaps rendering the process system potentially unsafe. Control valves are subject, for example, to binding, corrosion, erosion, plugging and fouling. This is especially true in experimental pilot plant work.

Thus a method and apparatus are needed for controlling the pressure within a flow reactor operated under harsh environmental conditions which is effective with highly fluctuating flow rates and over wide ranges of pressure and which does not suffer from the disadvantages of a variable orifice control valve.

SUMMARY OF THE INVENTION

According to the present invention a desired back pressure on a variable flow gas stream such as in a pressurized flow reactor is obtained by establishing and maintaining a fluidized bed of uniformly sized granular material of selected density by flowing the gas stream upwardly through the bed to establish and maintain a fluidized bed and varying the height of the bed of granular material to control the backpressure on the gas stream. By this procedure the pressure within a pressurized variable rate flow reactor may be maintained relatively constant even if the flow rate fluctuates greatly over a wide range of pressure.

DETAILED DESCRIPTION OF THE INVENTION

Figure 1:
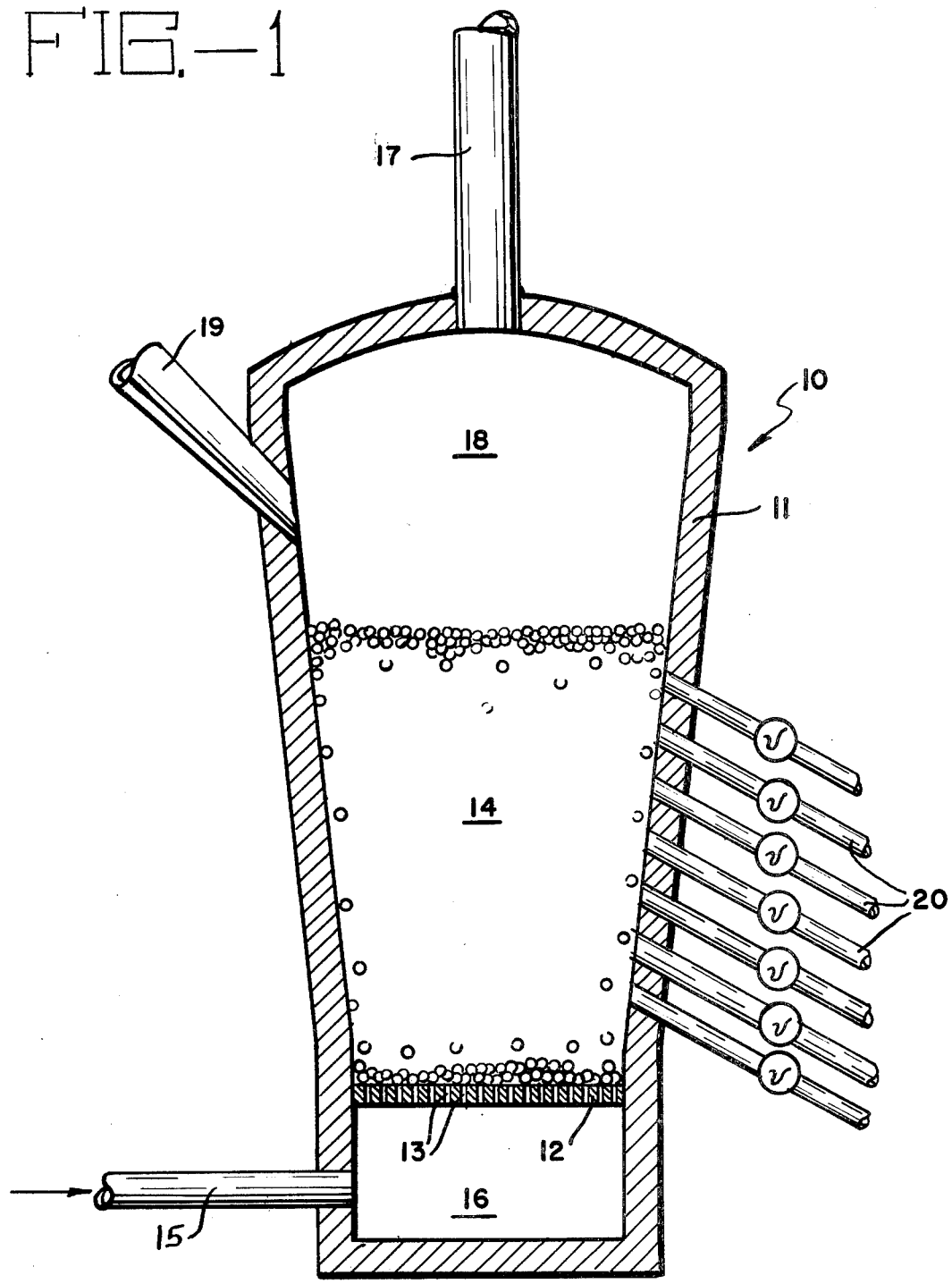
FIG. 1 is a sketch of a pressure regulator useful according to the present invention and FIG. 2 is a graph showing the pressure drop through a fluidized bed of $\frac{1}{4}''$ spherical tungsten granules having a density of 1204.4 lb/ft$^3$ for different bed heights.

As shown in FIG. 1 the pressure regulator of the present invention consists of a closed regulator vessel 10 having a side wall 11 which may be vertical or wherein, as shown in the drawing, the vessel diameter increases with height to allow for bed expansion. A gas distribution plate 12 having a multiplicity of uniform gas passages 13 therein extends horizontally across the lower portion of the regulator vessel 10 and supports a bed 14 of uniformly sized granular material of selected density. A high pressure gas inlet line 15 communicates with inlet plenum 16 located below gas distribution plate 12 and a low pressure gas outlet line 17 communicates with disengaging zone 18 in the upper portion of regulator vessel 10 above bed 14.

A valved inlet line 19 for bed material extends through the side wall 11 of regulator vessel 10 communicating with disengaging zone 18 and a plurality of vertically spaced valved outlet lines 20 extend at regular intervals through the side wall of regulator vessel 10 from a point just above gas distribution plate 12 to a point just below disengaging zone 18.

In operation the gas outlet line of a pressurized flow reactor—or other gas stream on which a desired back pressure is desired to be maintained—is connected to high pressure gas inlet line 15 and this gas is employed to fluidize the bed 14. To control the pressure in the pressurized flow reactor the height of the bed 14 is adjusted by adding bed material through line 19 or withdrawing bed material through lines 20. Bed material overflows through any of lines 20 in which the valve has been opened.

The technology of fluidized beds is well established. It is known for example that, as gas flow upwardly through a fixed bed of small granular solid increases, the pressure drop across the bed increases in direct proportion until a point is reached at which the gas flow around the bed of granular solids exerts sufficient drag force to suspend the particles. Under these conditions the force resisting the flow of gas (drag force) equals the bed weight and the bed volume expands until the particles are individually suspended in the gas stream and the entire bed behaves as a fluid. Beyond the point where the bed becomes fluidized the pressure drop remains essentially constant. Gas bubbles form and the granular material bed appears to boil. Finally, with greatly increased gas flow a point is reached where the granular material become entrained in the gas stream and are carried away. Between the incipient fluidization point and the particle entrainment point, the pressure drop is nearly constant.

As shown in Fluidization Engineering by Kunii et al., copyright 1969 by John Wiley & Sons, Inc., on page 74, for a bed of uniformly sized sand particles the fluidized bed state is obtained between an air velocity of 4 cm/sec and 50 cm/sec and within this range the pressure drop is essentially constant. Thus the method of the present invention is useful over a wide range of gas flow rates.

There are two main components in the pressure drop while fluidization is being obtained. The gas distributor pressure drop varies directly with flow but may represent a minor fraction of the total pressure drop. The component of pressure drop representing the resistance of the suspended granular material is proportional to the weight of the bed as well as the gas flow. Thus changing the weight of the bed as by adding or subtracting bed material to or from the bed to change the height of the bed will proportionally vary the pressure drop through the bed and thus the back pressure on the gas stream.

The pressure reducing capability of a fluidized bed will next be demonstrated.

Data: Gas-Air (Assumed for calculation simplicity)
Gas pressure 15 to 150 psi

Temp.—1600° F.=2060° R.

Bed Mat'l.—Tungsten ¼ in. spherical balls chrome plated (if necessary) density—1204.4 lb./ft.$^3$=19.3 gm/cm$^3$ (1) $\Delta P(gm/cm^2) = L_{mf}(1-e_{mf})(\rho_s - \rho_g)g/g_c$ (from Kunii et al., p.72 supra)

where $\Delta P$—pressure drop thru bed
$L_{mf}$—bed height (cm)
$e_{mf}$—Void fraction
$\rho_s$—bed mat'l. density (gm/cm$^3$)
$\rho_g$—gas density (gm/cm$^3$)
g—acceleration due to gravity (cm/sec$^2$), 930
$g_c$—conversion factor, 980 (gm-cm/gm-wt, sec$^2$)

For the cases for which this concept will apply ($15 \leq P \leq 150$ psi; $T \geq 1600°$ F.), the gas density will be negligible as compared to the solids density.

Therefore $\Delta P = L_{mf}(1-e_{mf})(\rho_s)$.

For a normally packed bed, e=0.375 (Kunii et al., p. 66).

(2) Therefore $\Delta P = L_{mf}(1-0.375)(\rho_s) = 0.625\ L_{mf}\rho_s$.

For this application, eqn. (2) reduces to (3) $\Delta P = 12.1 \times L_{mf}(gm/cm^2)$.

The following table shows the bed weight versus available pressure drop, using eqn. (3).

| Pressure Drop | | Bed Height | |
|---|---|---|---|
| gm/cm$^2$ | lb/in$^2$ | cm | ft |
| 1055 | 15 | 87.2 | 2.86 |
| 2109 | 30 | 174.3 | 5.72 |
| 3164 | 45 | 261.5 | 8.58 |
| 4219 | 60 | 348.7 | 11.44 |
| 5273 | 75 | 435.8 | 14.30 |
| 6328 | 90 | 523.0 | 17.16 |
| 7383 | 105 | 610.2 | 20.02 |
| 8437 | 120 | 697.3 | 22.88 |
| 9492 | 135 | 784.5 | 25.72 |
| 10546 | 150 | 871.6 | 28.58 |

Figure 2:
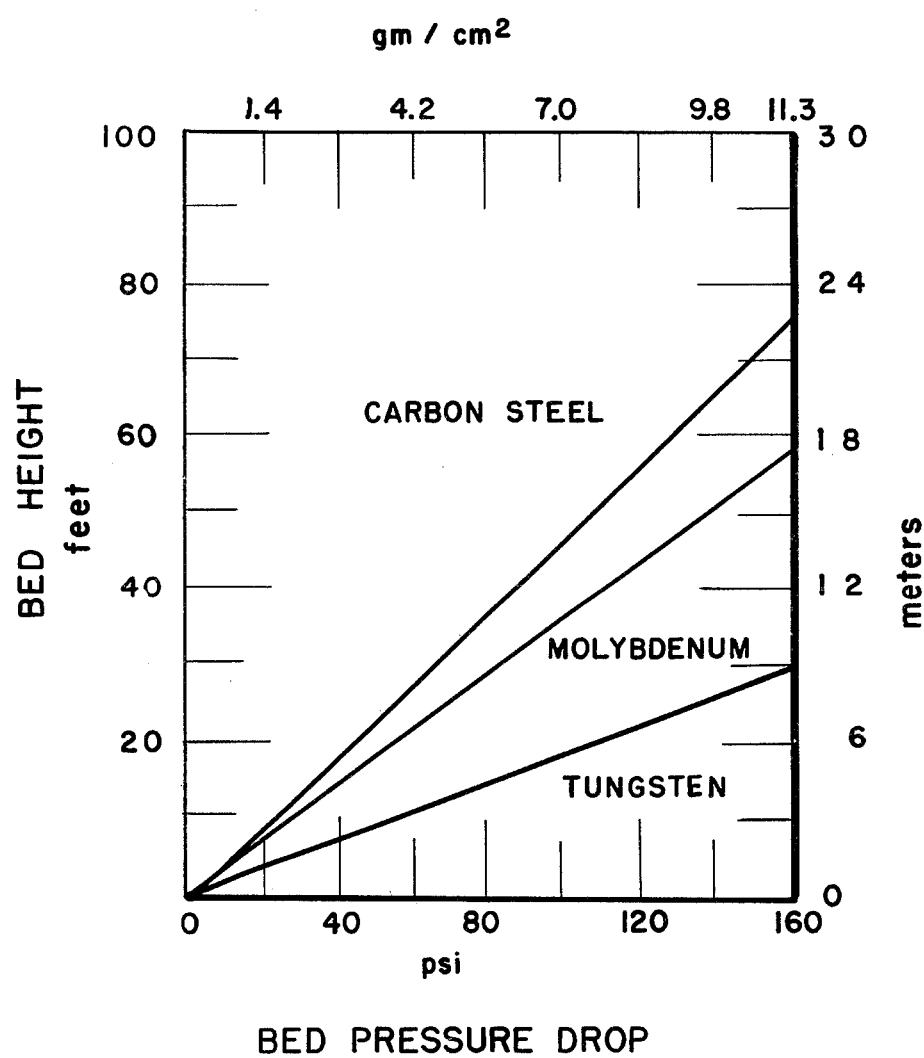

FIG. 2 is a plot of the above data, and also gives the relationship for two (2) other bed materials.

The embodiments of the invention in which an exclusive property or privilege is claimed are defined as follows:

1. A method of maintaining a desired back pressure on a variable flow gas stream comprising flowing said gas stream upwardly through a bed of granular material to establish and maintain a fluidized bed of said granular material and varying the height of the bed of granular material to control the back pressure on the variable flow gas stream.

2. A method of maintaining relatively constant the pressure within a pressurized variable rate flow reactor comprising passing the gas exiting the flow reactor upwardly through a bed of uniformly sized granular material of selected density to establish and maintain a fluidized bed of said granular material, the velocity of flow of the gas being effective for this purpose and varying the height of the bed of granular material to control the pressure in the flow reactor.

* * * * *